United States Patent [19]

Hartzog

[11] 3,890,496

[45] June 17, 1975

[54] VARIABLE 8421 BCD MULTIPLIER

[75] Inventor: Julian T. Hartzog, Clearwater, Fla.

[73] Assignee: Sperry Rand Corporation, New York, N.Y.

[22] Filed: Apr. 1, 1974

[21] Appl. No.: 456,999

[52] U.S. Cl. .......... 235/159
[51] Int. Cl. .......... G06f 7/52
[58] Field of Search .......... 235/159

[56] References Cited

UNITED STATES PATENTS

| | | | |
|---|---|---|---|
| 3,641,331 | 2/1972 | Kreidermacher | 235/159 |
| 3,644,724 | 2/1972 | Angelov et al. | 235/159 |
| 3,798,434 | 3/1974 | Melcher | 235/159 |
| 3,805,042 | 4/1974 | Melcher | 235/159 X |

*Primary Examiner*—Malcolm A. Morrison
*Assistant Examiner*—David H. Malzahn
*Attorney, Agent, or Firm*—Howard P. Terry

[57] ABSTRACT

An 8421 BCD multiplier multiplies a variable multiplicand by a variable multiplier and adds a variable carry in one operation. A matrix of AND gates provides a combination of signals uniquely determined by the values of the multiplicand and multiplier. The signals from the matrix are added to the carry signals in an adder bank and re-converted into the 8421 BCD format in a stepped group of converter units.

7 Claims, 2 Drawing Figures

VARIABLE 8421 BCD MULTIPLIER

BACKGROUND OF THE INVENTION

1. Field of the Invention

The present invention relates to digital multipliers and more specifically to fast acting multipliers for use in the 8421 BCD format.

2. Description of the Prior Art

A variety of digital multipliers are known in the art. Many of these prior art multipliers rely on an accumulator method consisting of an add and shift technique in which the multiplicand is alternately shifted one place and added to the previous value. Still other multipliers use an over-and-over addition technique in which the multiplicand is added to itself a number of times equal to the value of the multiplier. Since either of these techniques require a series of operations, the multiplication process may be unduly time consuming.

SUMMARY OF THE INVENTION

The apparatus of the present invention accepts multiplicand, multiplier, and carry signals in the 8421 BCD format, operates on these signals simultaneously to provide an intermediate group of signals in the binary format, and reconverts these intermediate signals to the 8421 BCD format in one operation.

DESCRIPTION OF THE PREFERRED EMBODIMENT

Figure 1:
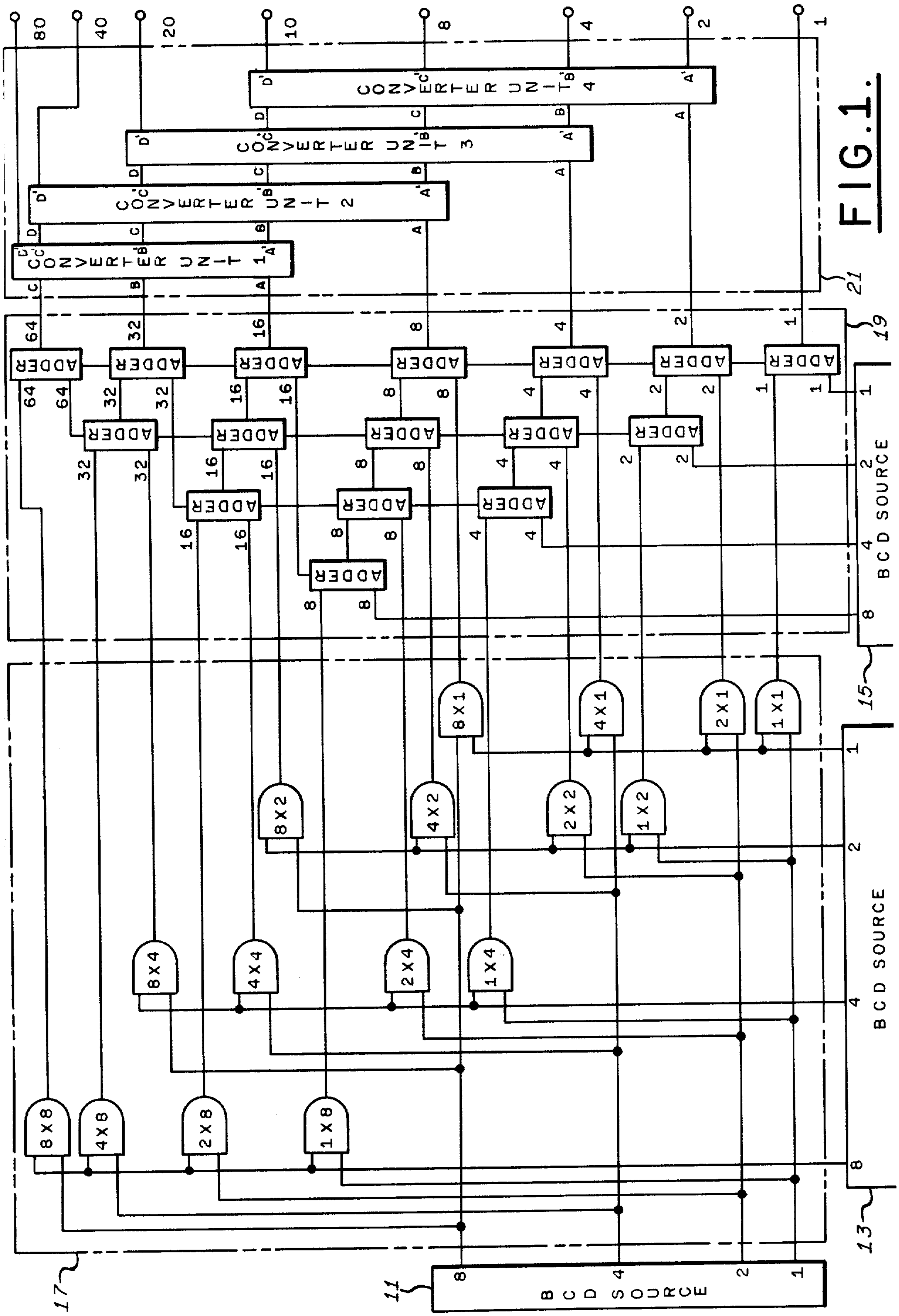
FIG. 1 is a diagram illustrating a circuit constructed in accordance with the principles of the invention.

Referring now to FIG. 1, 8421 BCD signals to be multiplied are applied to the multiplier circuit from a first BCD source 11 and a second BCD source 13. Carry signals may be applied to the circuit from the BCD source 15. The various BCD sources may represent any type of source of 8421 BCD signals capable of applying data to all input terminals simultaneously. Typically, such sources would consist of registers from which the information could be strobed into the multiplier.

The multiplicand may be applied to either source 11 or 13 and the multiplier applied to the other of these two sources. However, for purposes of explanation, it will be convenient to assume that the multiplicand is applied to the source 11 and the multiplier to the source 13. The signals from the sources 11 and 13 are applied to a matrix of AND gates 17. The matrix contains a separate AND gate corresponding to each possible combination of individual bits from the sources 11 and 13. To facilitate identification, the various AND gates have been labelled in accordance with the particular multiplicand and multiplier bits (from source 11 and source 13, respectively) to which they respond. The output signals from the array 17 are applied to a bank of adder circuits 19. The value assigned to the various signals from the matrix 17 is indicated in FIG. 1 adjacent the various adders in the bank 19. As can be seen from this representation, the sum of the individual signals from the matrix 17 is equal to the product of the multiplicand and the multiplier.

It will also be noticed from FIG. 1 that any one adder circuit is connected to receive signals of only one value whether these signals be product signals from the matrix 17, or carry signals from the source 15 or from another adder.

The adder circuits are conventional adders as described, for instance, in the book "Arithmetic Operations in Digital Computers" written by R. K. Richards and published by D. Van Nostrand Company in 1960.

Such adders have three input terminals for the reception of two input signals and a carry signal, and two output terminals from which an output signal and a carry signal may be derived. The adders function such that a signal applied to only one of the three input terminals will appear at the output terminal of the adder. Signals applied simultaneously to any two of the three input terminals will result in a carry signal but no output signal. Signals applied simultaneously to all three input terminals will result in both carry and output signals.

Since the individual adder circuits can accept only three signals, a group of such adder circuits corresponding to a given numerical value are connected in series where necessary. Thus three individual adder circuits are required to respond to a numerical value of "4", since a signal of such value may arise as an output of AND gate 1 × 4, AND gate 4 × 1, AND gate 2 × 2, a "4" output from carry source 15, or carry signals from either of the "2" adder circuits. The interconnection of the adder circuits in the adder bank is straightforward, and provides intermediate output signals from the adder bank in the binary format.

Finally, the binary output of the adder bank 19 is converted into the 8421 BCD format in a data converter 21.

The data converter includes a group of four converter units connected in a stepped arrangement. Each of the converter units is an adaptation of a double circuit for use with the 8421 BCD code described on pages 252–255 of the aforementioned book by R. K. Richards. A typical converter unit is pictured in FIG. 2, wherein the numerical weight to be assigned to information bits appearing on the various terminals has been included to aid in understanding the operation of this circuit.

A high level signal applied to one of the terminals A, B, C or D will be accorded a weight of 2, 4, 8 or 16 units, respectively. Output signals appearing on one of the terminals A', B', C' or D', will be assigned a weight of 2, 4, 8, or 10 units, respectively, in keeping with the 8421 BCD format. A signal on the D' terminal represents a "carry" signal.

Since the 8421 BCD format requires that signals on the D' output terminal be assigned a value of 10 units rather than 16 units, a correction factor of 6 units must be applied whenever a carry signal appears on the D' terminal.

The required correction is obtained through the use of the adders 23, 25 and 27, in cooperation with the gating network consisting of the AND gates 29 and 31 together with the OR gate 33. Effectively, the gating network provides a correction equal in value to the output signals of the two lowest order adders whenever a signal of the highest order occurs.

Figure 2:
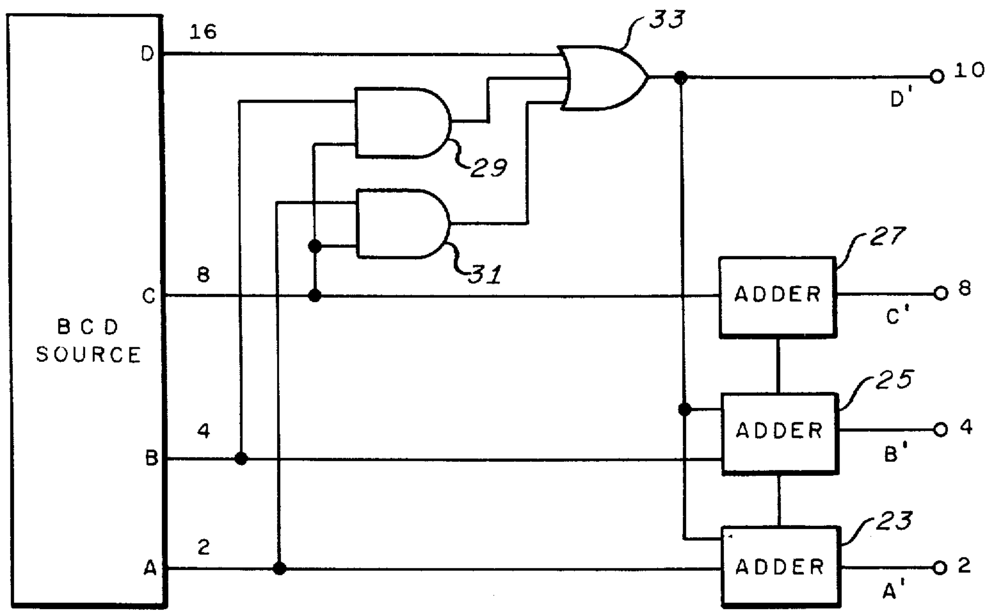
FIG. 2. PRIOR ART
FIG. 2 is a diagram illustrating a known type of BCD doubler adapted for use in the circuit of FIG. 1.

As can be seen from FIG. 2, individual input signals of 2, 4, or 8 units will be passed directly through the corresponding adder to produce output signals of 2, 4, or 8 units, respectively. On the other hand, an input signal having a decimal value of 18 would be evidenced by high level signals at input terminals A and D. The input signal on terminal D would pass through the gating network and appear at terminal D' and at the inputs of adders 23 and 25. The signal from input terminal A combined with the correction signal from D' would cause adder 23 to produce a carry signal but no output signal. The carry signal from the adder 23 combined with the correction signal from D' would cause adder 25 to produce only a carry signal. Since adder 27 receives only a carry signal, an output signal will also appear at its terminal C'. Thus the correction signal applied to the lowest two-ordered adders permits the output signal to appear in the 8421 BCD format.

The doubler circuit of FIG. 2 is adapted for use as a converter unit in the present invention by re-assigning values for signals appearing at the various terminals. Thus in the converter unit, signals appearing on input terminals A, B or C are assigned the same numerical values as the signals appearing on A', B', or C', whereas signals appearing on terminal D' are assigned a value which is less than the corresponding signal appearing on input terminal D by an amount equal to the sum of the adder outputs A' and B'. This effectively permits the circuit to convert from the binary to the 8421 BCD format without doubling the value of the received signals.

In general, the operation of the converter unit can be summarized as follows:

| | A' | B' | C' | D' |
|---|---|---|---|---|
| A | 1 | 0 | 0 | 0 |
| B | 0 | 1 | 0 | 0 |
| C | 0 | 0 | 1 | 0 |
| D | 1 | 1 | 0 | 1 |
| AB | 1 | 1 | 0 | 0 |
| AC | 0 | 0 | 0 | 1 |
| AD | 0 | 0 | 1 | 1 |
| BC | 1 | 0 | 0 | 1 |

It can be shown that as used in the present invention, values above those shown in the table do not occur in any of the converter units.

Referring again to FIG. 1, the data converter 21 includes four individual converter units connected in a stepped relationship. Intermediate, binary coded signals from the adder bank 19 are applied to the three lowest order input terminals A, B and C of converter unit 1. The highest order input terminal D of converter unit 1 is not used. The following converter units are connected in a stepped fashion so that each of the three highest ordered input terminals of each successive circuit are connected to the output terminal of the preceeding converter unit that is one order lower in value. The lowest ordered input terminal on each converter unit is connected to receive an intermediate binary signal directly from the adder bank 19. Furthermore, the carry output terminal (D') of each converter unit is connected directly to an output terminal of the multiplier circuit which represents a value which is a multiple of 10 units.

Essentially, each converter unit functions as a combined logic and switching circuit which analyzes the signals applied to its input terminals to determine if a carry signal will be required in the 8421 BCD format. If such a carry signal will be required, the converter unit subtracts out the carry signal, applies it to the carry output terminal D' and distributes the remainder of the signal to the appropriate lower ordered terminals through its adder circuits. If no carry signal is required, the logic circuit permits its input signals to be applied directly to the corresponding output terminals of equal numerical value.

It will be remembered that each converter unit is considered to produce output signals in the 8421 BCD format and that signals on each output terminal except the carry terminal are assigned a value equal to that of a signal on the corresponding input terminal.

Because of these considerations, converter unit 1, for example, is connected to receive binary signals having numerical values of 16, 32 and 64 on its A, B and C input terminals, respectively. Output signals on the corresponding A', B', C' and D' (carry) terminals are assigned values of 2 × 8, 8 × 8, and 10 × 8, respectively.

Because of the stepped arrangement of the converter units in the data converter, succeeding converter units are each shifted one place. Thus, converter unit 2 is considered to receive 1 × 8, 2 × 8, 4 × 8, and 8 × 8 signals and provide output signals having corresponding binary values of 2 × 4, 4 × 4, 8 × 4, and a carry of 10 × 4.

In this manner, the output signals from converter unit 4 constitute one decade of 8421 BCD bits whereas the carry signals from the four converter units constitute a second decade of bits in the same format.

As an aid in understanding the operation of the invention, consider a specific example wherein a multiplicand of decimal value 7 is applied to the source 11, a multiplier of decimal value 9 is applied to the source 13 and a carry of decimal value of 4 is applied to the source 15.

The source 11 will produce high level signals at terminals 1, 2 and 4, and the source 13 will produce high level signals at terminals 8 and 1. AND gate "4 × 8" will provide a signal to the first "32" adder. Similarly, the "2 × 8" and "1 × 8" AND gates will provide signals to the first "16" and "8" adders respectively. Furthermore, the "4 × 1" gate will provide a signal to the third "4" adder, the "2 × 1" AND gate will provide a signal to the second 2 adder, and the 1 × 1 AND gate will provide a signal to the 1 adder.

At the same time, the carry source 15 will provide a signal to the first 4 adder.

The signal from the 1 × 1 AND gate will pass directly through the 1 adder and appear at the 1 output terminal. The signal from the 2 × 1 AND gate will pass directly through the 2 adder and appear at the A input terminal of the converter unit 4.

The output signal from the carry source 15 will pass through the first and second 4 adders and appear at the corresponding input terminal of the third 4 adder. Since this third 4 adder also receives an input signal from the 4 × 1 AND gate, this adder will apply a carry signal to the fourth 8 adder, but will provide no output signal at its own terminal.

The 1 × 8 AND gate signal will pass directly through the first, second and third 8 adders so as to appear at the corresponding input terminal of the fourth 8 adder. Since this fourth 8 adder also receives a carry signal from the 4 adder, the 8 adder will produce no output signal of its own but will apply a carry signal to the third 16 adder.

In similar fashion, the 2 × 8 AND gate output signal will pass directly through the first and second 16 adders and appear at the corresponding input terminal of the third 16 adder along with the carry signal from the 8 adder. In the same way, the 4 × 8 AND gate output signal passes through the first 32 adder and appears at the input of the second 32 adder along with the carry signal from the 16 adder. This produces a carry signal at the input terminal of the 64 adder but no output signal from the 32 adder.

In summary, the adder bank 19 will produce high level signals in the binary format on its 1 and 64 terminals.

The signal from the 1 adder passes directly to the 1 output terminal of the multiplier. The signal from the 64 adder is applied directly to the C input terminal of converter unit 1 in the data converter 21. As can be seen from the previously described table, such an input signal applied to the converter unit 1 will appear at the C' output terminal and thereby cause an input signal to be appled to the D input terminal of converter unit 2.

Again referring to the previously described table, it can be seen that the input signal to the terminal D of the converter unit 2 will cause signals to appear at terminals A', B' and D' of converter unit 2. The signal on the D' terminal is applied directly to the output terminal of the multiplier having a value of 40 units.

The signals on the A' and B' terminals are applied to the B and C input terminals of the converter unit 3. This combination of input signals to the converter unit 3 produces output signals at the A' and D' output terminals of the converter unit 3. The D' signal appears at the multiplier output terminal having an assigned value of 20 units, whereas the A' signal is applied to the B input terminal of the converter unit 4.

Since the converter unit simultaneously receives a signal on its A input terminal from the second 2 adder gate, the converter unit 4 produces output signals at its A' and B' output terminals. These output signals are applied to the multiplier output terminals having assigned values of 2 and 4 units respectively.

In summary, the 1, 2, 4, 20 and 40 output terminals of the multiplier circuit will be energized and so provide an output signal in the 8, 4, 2, 1 BCD format, which is equivalent to the product of the received multiplicand and the multiplier signals plus the value of the carry signal from the source 15.

In situations where more than one decade of numbers is involved, the output signals 10 through 80 are used as the carry output and routed to the next higher decade. Since the multiplier circuit of the present invention operates simultaneously on the multiplicand, multiplier, and carry inputs, the operation time required for a calculation is merely that of the propagation delay time. Although the adder bank provides intermediate signals in the binary format, these signals are immediately re-converted into the 8421 BCD format so as to be compatible with the format of the input signals.

While the invention has been described in its preferred embodiment, it is to be understood that the words which have been used are words of description rather than limitation and that changes within the purview of the appended claims may be made without departing from the true scope and spirit of the invention in its broader aspects.

I claim:

1. An 8421 BCD digital multiplier comprising
matrix means,
means for applying multiplicand and multiplier input signal bits in the 8421 BCD format to the matrix means,
a plurality of dual input gating means in said matrix means, each gating means being connected to receive a different combination of single multiplicand and single multiplier signal bits, each of said gating means providing an individual signal when both of its input terminals are energized, said individual signals being assigned a numerical value equal to the product of the numerical values of the single signal bits applied to the input terminals of that gating means,
means to receive carry signal bits in the 8421 BCD format,
an adder bank,
means in said adder bank for adding individual signals of like numerical value from said matrix means to individual simultaneously received carry signal bits of like numerical value,
said adder bank having a plurality of output terminals for providing intermediate output signals comprised of individual bits having assigned values arranged in the binary format,
data conversion means including a series of connector units for converting the binary output signals from said adder bank into output signal bits in the 8421 BCD format,
each of said converter units including a plurality of input terminals for receiving individual bits of information and a plurality of output terminals for providing individual output bits in a given decade of the 8421 BCD format, plus a carry bit in the next higher decade of the same format,
said series of converter units being arranged in a stepped fashin in which the first unit in said series is connected to receive a group of the highest valued bits from said adder bank and each succeeding converter unit is connected to receive all bits except the carry bit from the preceding converter unit as well as the next lower valued bit from the adder bank,
the carry bit output terminal on each of said converter units being connected directly to an individual output terminal of the digital multiplier,
the output terminals on the last unit in said series being connected directly to an individual output terminal of the digital multiplier.

2. The digital multiplier of claim 1 wherein signal bits appearing at each output terminal except the carry terminal on a given converter unit are assigned the same numerical value as that of the input bits applied to a corresponding input terminal on a same converter unit,
each of said converter units further containing logic and switching means for adding a signal to the output terminals of the converter in response to the appearance of a carry signal in that converter, said added signal having a numerical value equal to the sum of the values assigned to output bits appearing on the two lowest ordered output terminals of the same converter.

3. The digital multiplier of claim 2 wherein said matrix means for providing individual signals includes an array of AND gates, each being coupled to receive a unique combination of first and second signal bits from simultaneously received multiplicand and multiplier signals respectively, each of said AND gates further providing individual signals to said adder bank.

4. The digital multiplier of claim 3 wherein said matrix means receives single decade multiplicand and multiplier signals and said adder bank receives single decade carry signals, said series of converter units containing four units.

5. The digital multiplier of claim 4 wherein the first converter unit in said series receives output signals representing the three highest valued bits in an intermediate output signal from the adder bank, said first converter unit further having three output terminals directly connected to the succeeding converter unit whereby a 3-bit output signal may be coupled to the succeeding converter unit in said series.

6. The digital multiplier of claim 5 wherein each converter unit except the first unit is connected to receive 3-bits from the preceding converter on its highest valued input terminals and a bit directly from the adder bank on its lowest valued input terminal.

7. The digital multiplier of claim 6 wherein the output signal bit representing one unit is derived directly from said adder bank.

* * * * *